United States Patent
Tooman

(10) Patent No.: US 7,329,112 B2
(45) Date of Patent: Feb. 12, 2008

(54) INJECTION MOLDING SYSTEM FOR INJECTION MOLDING A PLURALITY OF MATERIALS

(75) Inventor: Patrick A. Tooman, Clarkston, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 227 days.

(21) Appl. No.: 11/324,712

(22) Filed: Jan. 3, 2006

(65) Prior Publication Data

US 2006/0147577 A1  Jul. 6, 2006

Related U.S. Application Data

(60) Provisional application No. 60/641,252, filed on Jan. 4, 2005.

(51) Int. Cl.
*B29C 45/23* (2006.01)

(52) U.S. Cl. ..................... 425/130; 425/564

(58) Field of Classification Search ............. 425/130, 425/562, 563, 564, 565, 566
See application file for complete search history.

(56) References Cited

U.S. PATENT DOCUMENTS

| | | | |
|---|---|---|---|
| 4,173,448 A | 11/1979 | Rees et al. | |
| 4,964,795 A | 10/1990 | Tooman | |
| 5,067,893 A * | 11/1991 | Osuna-Diaz | 425/564 |
| 5,098,274 A * | 3/1992 | Krishnakumar et al. | 425/562 |
| 5,378,138 A | 1/1995 | Onuma et al. | |
| 5,470,219 A | 11/1995 | Yokoyama et al. | |
| 5,491,372 A | 2/1996 | Erhart | |
| 5,557,154 A | 9/1996 | Erhart | |
| 5,783,234 A | 7/1998 | Teng | |
| 5,820,803 A | 10/1998 | Hashimoto | |
| 5,834,041 A | 11/1998 | Sekine et al. | |
| 5,840,231 A | 11/1998 | Teng | |
| 5,919,492 A | 7/1999 | Tarr et al. | |
| 6,086,357 A | 7/2000 | Steil et al. | |
| 6,099,767 A | 8/2000 | Tarr et al. | |
| 6,129,541 A | 10/2000 | Takeda | |
| 6,179,604 B1 | 1/2001 | Takeda | |
| 6,294,604 B1 | 9/2001 | Moss et al. | |
| 6,343,925 B1 | 2/2002 | Kenko | |
| 6,464,909 B1 | 10/2002 | Kazmer et al. | |

(Continued)

OTHER PUBLICATIONS

"Exlar -GS Series Linear Actuator Overview", Exlar Corporation, Chanhassen,Minnesota,Mar. 9, 2005,pp. 1 through 2 "Exlar -GSX Series Linear Actuator Overview", Exlar Corporation, Chanhassen, Minnesota, Mar. 9, 2005,pp. 1 through 3.

*Primary Examiner*—Tim Heitbrink
(74) *Attorney, Agent, or Firm*—Bliss McGlynn, P.C.

(57) ABSTRACT

An injection molding system for injection molding a plurality of molten materials into a mold cavity includes a nozzle, a drop tip supported by the nozzle, and a central bore extending through the nozzle and drop tip. The injection molding system also includes a first and second flow passage each extending through the nozzle, so as to define a first and second nozzle flow passage, and drop tip, so as to define a first and second drop tip flow passage. The first and second drop tip flow passages each include a plurality of branching portions each defining a junction at which the respective flow passage communicates fluidly with the central bore.

20 Claims, 2 Drawing Sheets

U.S. PATENT DOCUMENTS 6,514,440 B1  2/2003  Kazmer et al.
6,638,049 B1  10/2003 Moss et al.

2003/0155672 A1  8/2003  Kazmer et al.

* cited by examiner

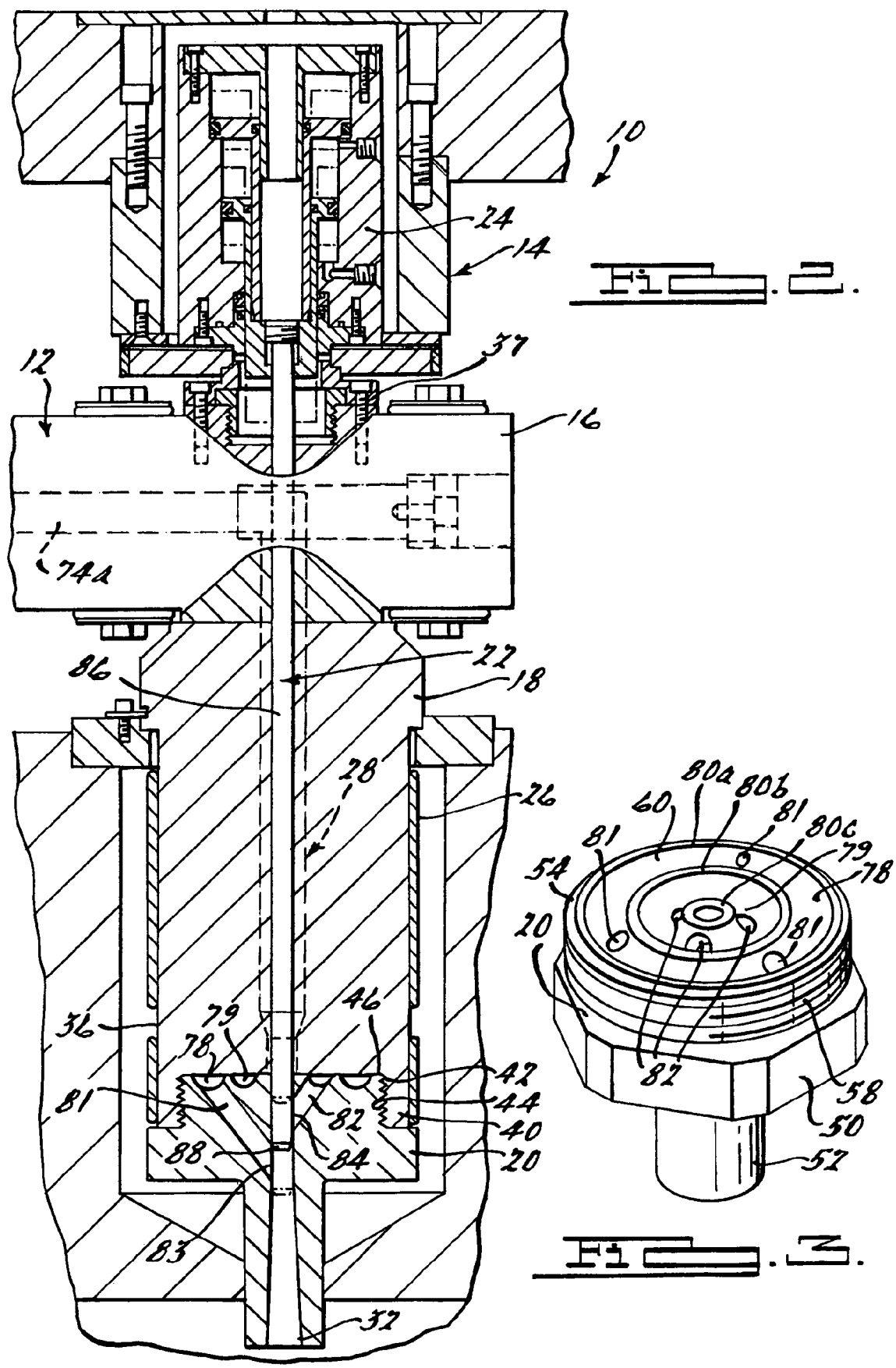

INJECTION MOLDING SYSTEM FOR INJECTION MOLDING A PLURALITY OF MATERIALS

CROSS-REFERENCE TO RELATED APPLICATION(S)

The present application claims the priority date of copending U.S. Provisional Patent Application Ser. No. 60/641,252, filed Jan. 4, 2005.

BACKGROUND OF THE INVENTION

1. Field of the Invention

The present invention relates generally to injection molding systems and, more particularly, to an injection molding system for injection molding a plurality of materials.

2. Description of the Related Art

Injection molding is a widely known manufacturing process used to produce a variety of parts. Injection molding involves introducing a molten material, such as a molten plastic or resin, into a cavity within a mold. The molten material hardens or cures in the mold in the shape of inner surfaces of the cavity. Then, the cured material is removed from the cavity.

A typical injection molding system includes a manifold assembly used for conveying molten material from a source such as a nozzle of an injection molding machine to a number of cavities or to multiple points within one large cavity of the mold. An example of such a manifold assembly is disclosed in U.S. Pat. No. 4,964,795 to Tooman. In that patent, the manifold assembly includes a manifold and a plurality of nozzles extending radially therefrom. Passageways are formed through the manifold and nozzles, through which the molten material may pass. The terminal end of the passageway, called a gate, is in fluid communication with the cavity of the mold.

In addition, a valve gate assembly is typically included in the injection molding system to regulate the flow of molten material through the gate into the cavity of the mold. An example of such a valve gate assembly is disclosed in U.S. Pat. No. 4,173,448 to Rees et al. In that patent, a valve gate assembly includes a valve rod or pin partially disposed within the passageway. The pin has a terminal end positioned near the gate such that it closes the gate and prevents the flow of molten material through the gate. The pin is operably attached to an actuator assembly that can move the pin axially away from the gate. As the pin moves farther away from the gate, the flow of the molten material through the gate increases.

The injection molding system often includes one or more heat sources, such as heating bands positioned on the outer surface of the nozzle and the manifold assembly. The heat sources supply heat to the molten material to maintain desired flow conditions.

It is known to provide injection molding systems with manifold assemblies having multiple flow passageways formed therein. A different molten material flows within each of the passageways, and the valve gate assembly regulates flow of these materials from the passageways into the cavity of the mold. This type of manifold assembly is used, for example, to mold parts with an outer "skin" made from one material and an inner "core" made from a different material. The valve gate assembly typically utilized includes a valve pin positioned within one of the passageways. The valve pin plugs that passageway while molten material flows through the other passageway to begin forming the outer "skin," and after a predetermined time, the valve pin opens to begin forming the inner "core."

One disadvantage of the above-described injection molding systems is that the flow of the molten molding materials is typically poor, thereby potentially degrading the material quality and appearance of the molded part. For instance, the valve pin creates undesirable shear on the molten material as it flows past the pin. Furthermore, pressure can build within the flowing molten material due to improperly sized flow passageways, especially near the gate. Also, one passageway is typically positioned closer than the other passageway to the heat source, and heat transfers more readily to one of the molten materials than the others. These factors can degrade the flow of the molten materials, giving users less control over the quality of the molded part. These factors also often cause an undue amount of residual molding materials to remain within the passageways after completing the molding process.

Therefore, it is desirable to provide a new injection molding system for injecting a plurality of materials in which shear on the molten materials is reduced. It is also desirable to provide an injection molding system in which the pressure of the molten materials remains more controllable and constant during the molding process. Further, it is desirable to provide an injection molding system with flow passageways arranged such that the heat source transfers heat more uniformly to the molding materials. Thus, there is a need in the art to provide an injection molding system that meets these desires.

SUMMARY OF THE INVENTION

Accordingly, the present invention is a nozzle and drop tip assembly for an injection molding system for injection molding a plurality of molten materials into a mold cavity. The nozzle and drop tip assembly includes a nozzle with an outer surface and a drop tip operatively supported by the nozzle. The nozzle and drop tip assembly also includes a central bore extending through the nozzle and the drop tip and defining a gate in fluid communication with the mold cavity. The central bore is adapted to operatively receive a valve member for movable operation therein. The nozzle and drop tip assembly includes a first flow passage extending through the nozzle, so as to define a first nozzle flow passage, and through the drop tip, so as to define a first drop tip flow passage. The first drop tip flow passage includes a plurality of first branching portions that each define a first junction at which the first flow passage communicates fluidly with the central bore. The nozzle and drop tip assembly further includes a second flow passage extending through the nozzle, so as to define a second nozzle flow passage, and through the drop tip, so as to define a second drop tip flow passage. The second drop tip flow passage includes a plurality of second branching portions that each define a second junction at which the second flow passage communicates fluidly with the central bore. The first junctions are disposed at substantially equal distances from the gate relative to each other and the second junctions are disposed as substantially equal distances from the gate relative to each other but the first junctions are disposed at a different distance from the gate relative to the second junctions to enable molten material to flow independently from the first junctions and the second junctions.

Additionally, the present invention is an injection molding system for injection molding a plurality of materials into a mold cavity. The injection molding system includes a valve gate assembly including a valve member and an actuator assembly operatively attached to the valve member and operable to actuate the valve member. The injection molding system also includes a nozzle with an outer surface and a drop tip operatively supported by the nozzle. The injection molding system further includes a central bore extending through the nozzle and the drop tip. The central bore defines a gate in fluid communication with the mold cavity. The valve member is movably disposed within the central bore. The injection molding system further includes a first flow passage extending through the nozzle, so as to define a first nozzle flow passage, and through the drop tip, so as to define a first drop tip flow passage. The first drop tip flow passage includes a plurality of first branching portions that each define a first junction at which the first flow passage communicates fluidly with the central bore. Also, the injection molding system includes a second flow passage extending through the nozzle, so as to define a second nozzle flow passage, and through the drop tip, so as to define a second drop tip flow passage. The second drop tip flow passage includes a plurality of second branching portions that each define a second junction at which the second flow passage communicates fluidly with the central bore. The cross sectional area of the first nozzle flow passage is approximately equal to the sum of the cross sectional area of each of the first branching portions of the first drop tip flow passage. Also, the cross sectional area of the second nozzle flow passage is approximately equal to the sum of the cross sectional area of each of the second branching portions of the second drop tip flow passage. The actuator assembly is operable to position the valve member in a closed position, in which the valve member seals each of the first and second junctions, an initial open position, in which the valve member is positioned away from the first junctions and simultaneously seals the second junctions, and a successive open position, in which the valve member is positioned away from the first and second junctions. The first and second nozzle flow passages are each generally located symmetrically with respect to the outer surface of the nozzle.

One advantage of the present invention is that an injection molding system is provided for injection molding a plurality of materials into a mold cavity. Another advantage of the present invention is that the injection molding system is provided with an actuator assembly that can individually allow a plurality of molten materials to flow into a mold cavity. A further advantage of the present invention is that an injection molding system is provided with flow passages positioned such that heat can be more evenly transferred to the molten material, thereby providing more control over the injection molding process. Another advantage of the present invention is that the injection molding system improves the flow of the molten material because the valve member is largely isolated from the flowing molten material and because the flow passages are sized to sustain more even pressure in the molten material. Yet another advantage of the present invention is that the injection molding system provides a great deal of control over the flow of the molten materials, improving the material quality and appearance of the molded part.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 2 is an elevational view of the injection molding system of FIG. 1; and

FIG. 3 is a perspective view of a drop tip of the injection molding system of FIG. 1.

DESCRIPTION OF THE PREFERRED EMBODIMENT(S)

Figure 1:
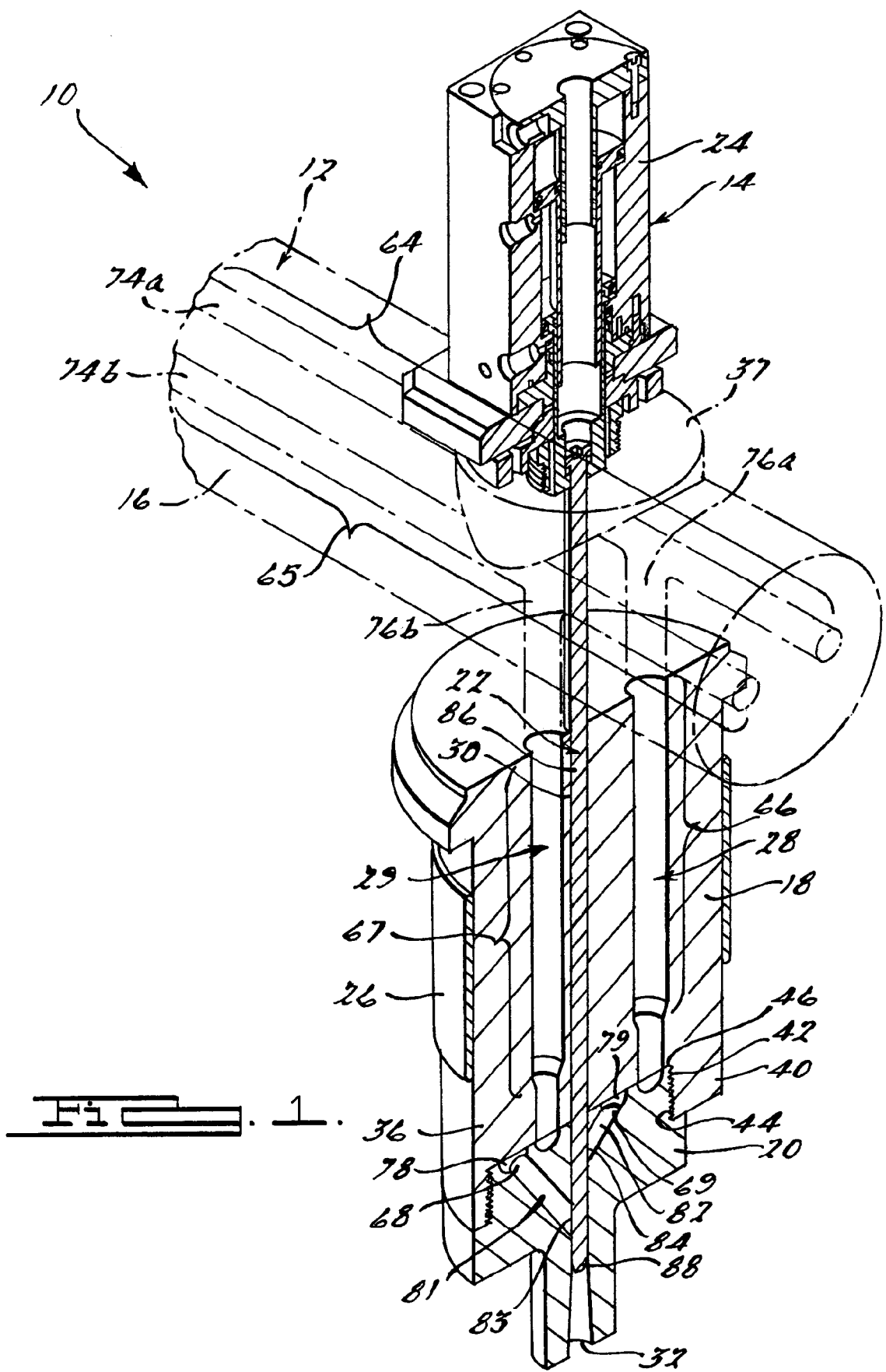
FIG. 1 is a fragmentary perspective view of an injection molding system according to the present invention.

Referring to the drawings, and in particular FIG. 1, one embodiment of an injection molding system 10, according to the present invention, is shown. The injection molding system 10 includes a manifold assembly, generally indicated at 12, and a valve gate assembly, generally indicated at 14. The manifold assembly 12 generally includes a manifold 16, at least one nozzle 18 extending outwardly from the manifold 16, and a drop tip 20 operatively supported by the nozzle 18. It should be appreciated that the manifold assembly 12 can include more than one nozzle 18, each with an attached drop tip 20. The valve gate assembly 14, on the other hand, generally includes a valve member 22, and an actuator assembly 24 operatively attached to the valve member 22. The injection molding system 10 further includes at least one, preferably a plurality of heat sources 26 mounted to the manifold 16 and nozzle 18.

The injection molding system 10 includes a first flow passage, generally indicated at 28 and a second flow passage, generally indicated at 29. The first and second flow passages 28, 29 each extend through the manifold 16, the nozzle 18, and the drop tip 20. The injection molding system 10 also includes a central bore 30 extending through the manifold 16, the nozzle 18, and drop tip 20. The injection molding system 10 also includes a gate 32 in fluid communication with a mold cavity (not shown). In the embodiment shown, the terminal end of the central bore 30 defines the gate 32. The first and second flow passages 28, 29 are each in fluid communication with the central bore 30. As such, molten material (not shown) can flow through the first and second flow passages 28, 29 through a portion of the central bore 30, through the gate 32 and into the mold cavity. The valve member 22 is movably disposed within the central bore 30, and the actuator assembly 24 is operable to actuate the valve member 22 to thereby regulate flow of the molten materials through the gate 32. It should be appreciated that the injection molding system 10 can be used for injection molding a plurality of molten materials into the mold cavity at separate times. For instance, one molding material could flow through the first flow passage 28 and into the mold cavity to form a "skin" of the injection molded part, and a separate molding material could flow through the second flow passage 29 and into the mold cavity to form a "core" of the injection molded part. Although only two flow passages 28, 29 are shown, it should be appreciated that any number of flow passages 28, 29 could be included in the injection molding system 10 without departing from the scope of the invention.

Referring to the embodiment shown in FIGS. 1 and 2, the manifold 16 is generally tubular in shape with a plurality of pads 37 extending radially outward therefrom. The pads 37 are arranged in pairs opposite each other on the manifold 16.

The nozzle 18 is also generally tubular in shape and is mounted to one of the pads 37 in any suitable manner. The nozzle 18 extends radially outward from the pad 37 of the manifold 18 toward the mold cavity. The nozzle 18 includes a lower end 40 disposed adjacent the mold cavity. The lower end 40 of the nozzle 18 includes a round, upwardly extending recess 42 with an inner diameter 44 that is threaded and a round top surface 46. It should be appreciated that the center of the recess 42 is misaligned with the axis of the nozzle 18.

The manifold assembly 12 also includes at least one, and preferably a plurality of heat sources 26. In the embodiment illustrated, the heat sources 26 are in the form of heater bands that are removably disposed about the outer surfaces 36 of the nozzle 18 and the manifold 16 to supply heat to molten molding materials flowing through the manifold 16 and nozzle 18.

Referring to the embodiment shown in FIG. 3, the drop tip 20 includes a body 50, a post 52 extending downward from the body 50, and a connecting portion 54 extending upward from the body 50. The post 52 is generally circular in cross section and is sized so as to fit within a receiving opening of the mold. The connecting portion 54 is generally circular in cross section with an outer diameter 58 that is threaded. As illustrated in FIGS. 1 and 2, the threading of the outer diameter 58 threadably attaches the drop tip 20 inside the recess 42 of the nozzle 18. In the embodiment shown, the axis of the drop tip 20 is misaligned with the axis of the nozzle 18. It should be appreciated that the drop tip 20 can be attached to the nozzle 18 in any suitable manner.

Referring to FIGS. 1 and 2, the central bore 30 is generally circular in cross section and extends transversely through the manifold 16 and through a pair of the pads 37 arranged on opposite sides of the manifold 16. The central bore 30 also extends axially through the nozzle 18 and axially through the centerline of the drop tip 20. It should be appreciated that the axis of the central bore 30 is generally linear or straight. It should also be appreciated that the central bore 30 is continuous as it extends through the manifold 16, nozzle 18, and drop tip 20, although the central bore 30 can vary in size along its length.

Also, the first and second flow passages 28, 29 each extend uninterrupted through the manifold 16, the nozzle 18, and the drop tip 20. As such, the first flow passage 28 defines a first manifold flow passage 64 (i.e., the portion of the first flow passage 28 extending through the manifold 16), a first nozzle flow passage 66 (i.e., the portion of the first flow passage 28 extending through the nozzle 18), and a first drop tip flow passage 68 (i.e., the portion of the first flow passage 28 extending through the drop tip 20). The second flow passage 29 similarly defines a second manifold flow passage 65, a second nozzle flow passage 67, and a second drop tip flow passage 69.

The first and second manifold flow passages 64, 65 each have a generally circular cross section and are transversely spaced from each other. In the embodiment illustrated, the first and second manifold flow passages 64, 65 each include a first portion 74a, 74b that is in fluid communication with a sprue (not shown) to receive molten materials from a molding source (not shown). The first portions 74a, 74b extend in a generally horizontal direction, generally parallel to the axis of the manifold 16. Also, the first and second manifold flow passages 64, 65 each include a second portion 76a, 76b that is in fluid communication with the corresponding first portion 74a, 74b and extends in a generally vertical direction axially through the pad 37 adjacent the nozzle 18.

The first and second nozzle flow passages 66, 67 each have a generally circular cross section and generally have a linear axis. The first and second nozzle flow passages 66, 67 are in fluid communication with the corresponding second portion 76a, 76b of the first and second manifold flow passages 64, 65. The first and second nozzle flow passages 66, 67 are disposed generally parallel to the central bore 30 and are separated radially therefrom. Preferably, the first and second nozzle flow passages 66, 67 are located symmetrically with respect to the outer surface 36 of the nozzle 18 to facilitate more even heating between the molten materials within the first and second nozzle flow passages 66, 67.

The first drop tip flow passage 68 includes a first upper chamber 78, and the second drop tip flow passage 69 similarly defines a second upper chamber 79. The first nozzle flow passage 66 is in fluid communication with the first upper chamber 78, and the second nozzle flow passage 67 is in fluid communication with the second upper chamber 79.

As shown in FIG. 3, the upper surface 60 of the drop tip 20 includes three circular ridges 80a, 80b, 80c extending away from the upper surface 60. Each of the ridges 80a, 80b, 80c have different diameters and are concentrically arranged about the center of the upper surface 60. Between each ridge 80a, 80b, 80c, the upper surface 60 of the drop tip 20 is coved. As shown in FIGS. 1 and 2, the ridges 80a, 80b, 80c abut the top surface 46 of the recess 42 of the nozzle 18 when the drop tip 20 is attached to the nozzle 18. As such, the coved space between the outer ridge 80a and the middle ridge 80b and the top surface 46 cooperate to form the first upper chamber 78 of the first drop tip flow passage 68. Similarly, the coved space between the middle ridge 80b and the center ridge 80c and the top surface 46 cooperate to form the second upper chamber 79 of the second drop tip flow passage 69. Thus, each of the first and second upper chambers 78, 79 has the shape of a partial torus and is arranged concentrically about the axis of the drop tip 20.

The first drop tip flow passage 68 also includes a plurality of first branching portions 81, and the second drop tip flow passage 79 includes a plurality of second branching portions 82. The first branching portions 81 are each fluidly connected to the first upper chamber 78, and the first branching portions 81 each define a first junction 83 at which the first flow passage 28 communicates fluidly with the central bore 30. The second branching portions 82 are each fluidly connected to the second upper chamber 79, and the second branching portions 82 each define a second junction 84 at which the second flow passage 29 communicates fluidly with the central bore 30. In the embodiment illustrated, the first branching portions 81 each have a circular cross section and are evenly spaced about the axis of the drop tip 20. The first branching portions 81 each extend at an angle from the first upper chamber 78 toward the central bore 30, and each terminates at the respective first junction 83. The second branching portions 82 are similar to the first branching portions 81 except that the second branching portions 82 fluidly connect the second upper chamber 79 to the central bore 30 at the second junctions 84.

It should be appreciated that molten material flows through the first and second flow passages 28, 29 through the first and second junctions 83, 84 through the central bore 30, and then through the gate 32 into the mold to form an injection molded part made of a plurality of materials.

Preferably, the first junctions 83 are located at approximately equal distances from the gate 32 relative to each other, and the second junctions 84 are located at approximately equal distances from the gate 32 relative to each other. Additionally, the first junctions 83 are preferably located at a different proximity relative to the gate 32 as compared to the second junctions 84. This arrangement enables the flow of molten materials from each of the first and second flow passages 28, 29 to occur individually.

It should be appreciated that the first and second drop tip flow passages 68, 69 provide improved flow of molten material through the injection molding system 10. For instance, because there are a plurality of first branching portions 81 and second branching portions 82, the pressure of the flowing molten materials remains more constant. In addition, the cross-sectional area of the first nozzle flow passage 66 is approximately equal to the sum of the cross sectional area of each of the first branching portions 81 to thereby allow the molten material to flow more freely and avoid elevating the pressure therein. Likewise, the cross-sectional area of the second nozzle flow passage 67 is approximately equal to the sum of the cross-sectional area of each of the second branching portions 82 to improve flow through the second flow passage 29. It should be appreciated that these features improve the material quality and appearance of the finished molded part. It should also be appreciated that the residual molding materials are less likely to build within the first and second flow passages 28, 29 after the molding process due to the improved material flow.

The injection molding system 10 also includes a valve member 22 as stated above. The valve member 22 can be of any type suitable for regulating the flow of molding materials into the mold cavity. For instance, in the embodiment illustrated, the valve member 22 is a rod or pin 86. The pin 86 is generally linear and is disposed within the central bore 30. The pin 86 includes a valve end 88 that is positioned adjacent the gate 32. Preferably, the valve end 88 and the gate 32 are each sized such that the valve end 88 seals the gate 32 when the valve end 88 is positioned within the gate 32 and such that the valve end 88 unseals the gate 32 when the valve end 88 moves away from the gate 32. It should be appreciated that the flow of molten materials generally increases as the valve end 88 moves away from the gate 32.

The pin 86 is preferably sized to seal each of the first junctions 83 when the valve end 88 is positioned below the first junctions 83, and the pin 86 allows flow through the first junctions 83 when the valve end 88 is positioned above the first junctions 83. Likewise, the pin 86 is preferably sized to seal each of the second junctions 84 when the valve end 88 is positioned below the second junctions 84, and the pin 86 allows flow through the second junctions 84 when the valve end 88 is positioned above the second junctions 84.

The pin 86 is operatively attached to the actuator assembly 24. The actuator assembly 24 can be of any type for actuating the pin 86, such as an electric or hydraulic system. The actuator assembly 24 is operable to position the pin 86 in a closed position (shown in phantom lines), an initial open position (shown in solid lines), and a successive open position (shown in phantom lines) as illustrated in FIGS. 1 and 2. Specifically, in the embodiment illustrated, when the actuator assembly 24 moves the pin 86 to the closed position, the valve end 88 is positioned within the gate 32 and below each of the first and second junctions 83, 84 such that the pin 86 seals the gate 32 as well as each of the first and second junctions 83, 84. When the actuator assembly 24 moves the pin 86 to the initial open position, the valve end 88 is positioned away from the gate 32, away from and above the first junctions 83, and below the second junctions 84, such that the pin 86 allows flow through the first junctions 83 and simultaneously seals the second junctions 84. Additionally, when the actuator assembly 24 moves the pin 86 to the successive open position, the valve end 88 is positioned away from the gate 32 and away from and above both of the first and second junctions 83, 84, such that the pin 86 allows flow through each of the first and second junctions 83, 84 into the mold cavity.

During the injection molding process, when the pin 86 is in the closed position, molten material is introduced into the first and second flow passages 28, 29, but the pin 86 seals each of the first and second junctions 83, 84 and the gate 32 such that the molten material may not enter the mold cavity. Then, the actuator assembly 24 moves the pin 86 to the initial open position to thereby allow molten material in the first flow passage 28 to flow through the first junctions 83, through the gate 32, and into the mold cavity. This typically would occur to begin forming a skin or outside surface of the molded part. It is appreciated that the molten material in the second flow passage 29 is unable to flow into the mold cavity at that time because the pin 86 seals the second junctions 84.

Next, after a predetermined time, the actuator assembly 24 moves the pin 86 to the successive open position to thereby allow molten material in the second flow passage 29 to flow through the second junctions 84, through the gate 32, and into the mold cavity. This typically would occur to begin forming a core or internal material of the molded part. As such, the injection molding system 10 allows for the injection of multiple materials into one mold cavity.

Each of the first and second nozzle flow passages 66, 67 are generally located symmetrically with respect to the outer surface 36 of the nozzle 18. As such, heat from the heat sources 26 attached to the outer surface 36 can more evenly transfer to the molten materials within the first and second nozzle flow passages 66, 67. Because of the more even heating, the flow of the molten materials can be controlled more easily, thereby increasing the quality of the molded part.

Also, the valve pin 86 is largely isolated from the flowing molten material. As such, the valve pin 86 is unlikely to create shear in the flowing molten materials, and the flow of the molten materials improves as a result. It should be appreciated that this also improves the amount of control over the flow of the molten materials.

Furthermore, the first and second drop tip flow passages 68, 69 are unlikely to cause pressure to build within the flowing molten materials. For instance, the first and second branching portions 81, 82 ensure that the molten material flows evenly into the mold cavity. Also, the cross-sectional area of the first and second branching portions 81, 82 are approximately equal to the cross-sectional area of the first and second nozzle flow passages to thereby ensure smoother flow of the molten material therethrough. It should be appreciated that this allows the user to control the flow of molten materials more readily, improving the material quality and appearance of the molded part.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claim, the present invention may be practiced other than as specifically described.

What is claimed is:

1. A nozzle and drop tip assembly for an injection molding system for injection molding a plurality of molten materials into a mold cavity comprising:
   a nozzle with an outer surface;
   a drop tip operatively supported by said nozzle;
   a central bore extending through said nozzle and said drop tip and defining a gate in fluid communication with the mold cavity, said central bore adapted to operatively receive a valve member for movable operation therein;
   a first flow passage extending through said nozzle, so as to define a first nozzle flow passage, and through said drop tip, so as to define a first drop tip flow passage, wherein said first drop tip flow passage includes a plurality of first branching portions that each define a first junction at which said first flow passage communicates fluidly with said central bore;

a second flow passage extending through said nozzle, so as to define a second nozzle flow passage, and through said drop tip, so as to define a second drop tip flow passage, wherein said second drop tip flow passage includes a plurality of second branching portions that each define a second junction at which said second flow passage communicates fluidly with said central bore; and wherein said first junctions are disposed at substantially equal distances from said gate relative to each other and said second junctions are disposed as substantially equal distances from said gate relative to each other but said first junctions are disposed at a different distance from said gate relative to said second junctions to enable molten material to flow independently from said first junctions and said second junctions.

2. A nozzle and drop tip assembly as set forth in claim 1 including at least one heat source mounted to said outer surface of said nozzle.

3. A nozzle and drop tip assembly as set forth in claim 1 wherein said nozzle includes a lower end adapted to operatively engage said drop tip, said lower end having an upwardly extending recess.

4. A nozzle and drop tip assembly as set forth in claim 3 wherein said recess includes a threaded inner diameter and said drop tip includes a connecting portion having a threaded outer diameter to threadably attach said connecting portion to said upwardly extending recess.

5. A nozzle and drop tip assembly as set forth in claim 1 wherein said drop tip includes a body, a post extending downward from said body to operatively engage an opening within a mold and an upper surface disposed adjacent said nozzle, said upper surface having a plurality of ridges concentrically disposed thereon, each of said ridges having a different diameter.

6. A nozzle and drop tip assembly as set forth in claim 5 wherein said ridges cooperate with said nozzle to define a first upper chamber and a second upper chamber therebetween, said first upper chamber adapted to direct molten materials from said first flow passage to said first branching portions and said second upper chamber adapted to direct molten materials from said second flow passage to said second branching portions.

7. A nozzle and drop tip assembly as set forth in claim 6 wherein the cross sectional area of said first nozzle flow passage is substantially equal to the sum of the cross sectional area of said first branching portions and the cross sectional area of said second nozzle flow passage is substantially equal to the sum of the cross sectional area of said first branching portions.

8. A nozzle and drop tip assembly as set forth in claim 1 wherein said first branching portions and said second branching portions extend at an angle from said first flow passage and said second flow passage to said central bore.

9. A nozzle and drop tip assembly as set forth in claim 1 wherein said first nozzle flow passage and said second nozzle flow passage are located symmetrically with respect to said outer surface of said nozzle.

10. An injection molding system for injection molding a plurality of molten materials into a mold cavity comprising:

a valve gate assembly including a valve member and an actuator assembly operatively attached to said valve member and operable to actuate said valve member;

a nozzle with an outer surface;

a drop tip operatively supported by said nozzle;

a central bore extending through said nozzle and said drop tip and defining a gate in fluid communication with the mold cavity, said valve member being movably disposed within said central bore;

a first flow passage extending through said nozzle, so as to define a first nozzle flow passage, and through said drop tip, so as to define a first drop tip flow passage, wherein said first drop tip flow passage includes a plurality of first branching portions that each define a first junction at which said first flow passage communicates fluidly with said central bore;

a second flow passage extending through said nozzle, so as to define a second nozzle flow passage, and through said drop tip, so as to define a second drop tip flow passage, wherein said second drop tip flow passage includes a plurality of second branching portions that each define a second junction at which said second flow passage communicates fluidly with said central bore; and wherein said actuator assembly is operable to position said valve member in a closed position in which said valve member seals each of said first and second junctions, an j initial open position in which said valve member is positioned away from said first junctions and simultaneously seals said second junctions, and a successive open position in which said valve member is positioned away from said first and second junctions.

11. An injection molding system as set forth in claim 10 including a manifold assembly disposed between said actuator assembly and said nozzle, said manifold assembly having a first manifold flow passage in fluid communication with said first flow passage and a second manifold flow passage in fluid communication with said second flow passage, said first manifold flow passage and said second manifold flow passage being adapted to facilitate delivery of molten materials to said nozzle.

12. An injection molding system as set forth in claim 11 wherein said first and second manifold flow passages are transversely spaced relative to each other.

13. An injection molding system as set forth in claim 10 including at least one heat source mounted to said outer surface of said nozzle, said heat source adapted to facilitate uniform heating of molten material within said first flow passage and said second flow passage.

14. An injection molding system as set forth in claim 13 wherein said heat source is a heater band removably disposed about said outer surface of said nozzle.

15. An injection molding system as set forth in claim 10 wherein said nozzle includes a lower end adapted to operatively engage said drop tip, said lower end having an upwardly extending recess.

16. An injection molding system as set forth in claim 15 wherein said recess includes a threaded inner diameter and said drop tip includes a connecting portion having a threaded outer diameter to threadably attach said connecting portion to said upwardly extending recess.

17. An injection molding system as set forth in claim 10 wherein said drop tip includes a body, a post extending downward from said body to operatively engage an opening within a mold and an upper surface disposed adjacent said nozzle, said upper surface having a plurality of ridges concentrically disposed thereon, each of said ridges having a different diameter.

18. An injection molding system as set forth in claim 17 wherein said ridges cooperate with said nozzle to define a first upper chamber and a second upper chamber therebetween, said first upper chamber adapted to direct molten materials from said first flow passage to said first branching portions and said second upper chamber adapted to direct molten materials from said second flow passage to said second branching portions.

19. An injection molding system as set forth in claim 10 wherein the cross sectional area of said first nozzle flow passage is substantially equal to the sum of the cross sectional area of said first branching portions and the cross sectional area of said second nozzle flow passage is substantially equal to the sum of the cross sectional area of said first branching portions.

20. An injection molding system as set forth in claim 10 wherein said first junctions are disposed at substantially equal distances from said gate relative to each other and said second junctions are disposed as substantially equal distances from said gate relative to each other but said first junctions are disposed at a different distance from said gate relative to said second junctions to enable molten material to flow independently from said first junctions and said second junctions.

* * * * *

UNITED STATES PATENT AND TRADEMARK OFFICE
CERTIFICATE OF CORRECTION

PATENT NO. : 7,329,112 B2  
APPLICATION NO. : 11/324712  
DATED : February 12, 2008  
INVENTOR(S) : Patrick A. Tooman It is certified that error appears in the above-identified patent and that said Letters Patent is hereby corrected as shown below:

Column 8, line 53, "claim" should read -- claims --; and  
Column 10, line 25, after "an" delete -- j --.

Signed and Sealed this

Second Day of September, 2008

JON W. DUDAS  
*Director of the United States Patent and Trademark Office*